(12) United States Patent
Plettner et al.

(10) Patent No.: US 6,185,513 B1
(45) Date of Patent: Feb. 6, 2001

(54) DATA RECORDER

(75) Inventors: Andreas Plettner, Feldafing; Karl Haberger, Planegg, both of (DE)

(73) Assignee: Fraunhofer-Gesellschaft, Munich (DE)

( * ) Notice: Under 35 U.S.C. 154(b), the term of this patent shall be extended for 0 days.

(21) Appl. No.: 09/055,022

(22) Filed: Apr. 3, 1998

(51) Int. Cl.$^7$ .............................. G01D 1/14; G01D 21/02
(52) U.S. Cl. .............................. 702/187; 702/56; 702/141
(58) Field of Search ........................ 702/22, 33, 56–127, 702/130, 138, 141–150, 187–189

(56) References Cited

U.S. PATENT DOCUMENTS

| | | | |
|---|---|---|---|
| 4,114,450 | * 9/1978 | Shulman et al. | 73/489 |
| 4,745,564 | * 5/1988 | Tennes et al. | 702/141 |
| 5,117,096 | 5/1992 | Bauer et al. | 235/375 |
| 5,153,842 | 10/1992 | Dlugos, Sr. et al. | 364/478 |
| 5,173,609 | 12/1992 | Lacoste et al. | 250/370.07 |

FOREIGN PATENT DOCUMENTS

| | | |
|---|---|---|
| 0 512 543 | 11/1992 | (EP) . |
| 2267156 | 11/1993 | (GB) . |
| WO 94/14133 | 6/1994 | (WO) . |

OTHER PUBLICATIONS

Bangs, The Newest Generation; it Could be Christened "Sherlock", May 1968.*

Shupe et al., Designing an Instrumented test Egg for Detecting Impact Breakage, unknown date (presumed prior art).*

Poulalion, The Recording and Preparation of Transportation Environmental Data, Apr. 1969.*

TEMARS, unattributed, 1967.*

Impact Recorders—They're Reaching New Levels of Sophistication, unattributed, May 1968.*

Data Recorders: Priciples and Applications, Kawai, Test & Measurement World, Oct. 1984.*

* cited by examiner

*Primary Examiner*—Marc S. Hoff
*Assistant Examiner*—Craig Steven Miller
(74) *Attorney, Agent, or Firm*—Christie, Parker & Hale, LLP

(57) ABSTRACT

A data recorder has at least one sensor unit to compile at least one measurement value to be recorded during a monitoring interval, a control unit to control the compiling and recording of measurement data, a clock unit to provide a reference time on the basis of which the actual measurement times can be defined, a memory unit to store the measurement values compiled and the corresponding reference time provided for each measurement value, a battery unit for power supply, a fixation unit to fix the data recorder to an item to be monitored, and an interruption unit which interrupts the recording and/or compiling of measurement data upon any manipulation of the fixation unit.

21 Claims, 1 Drawing Sheet

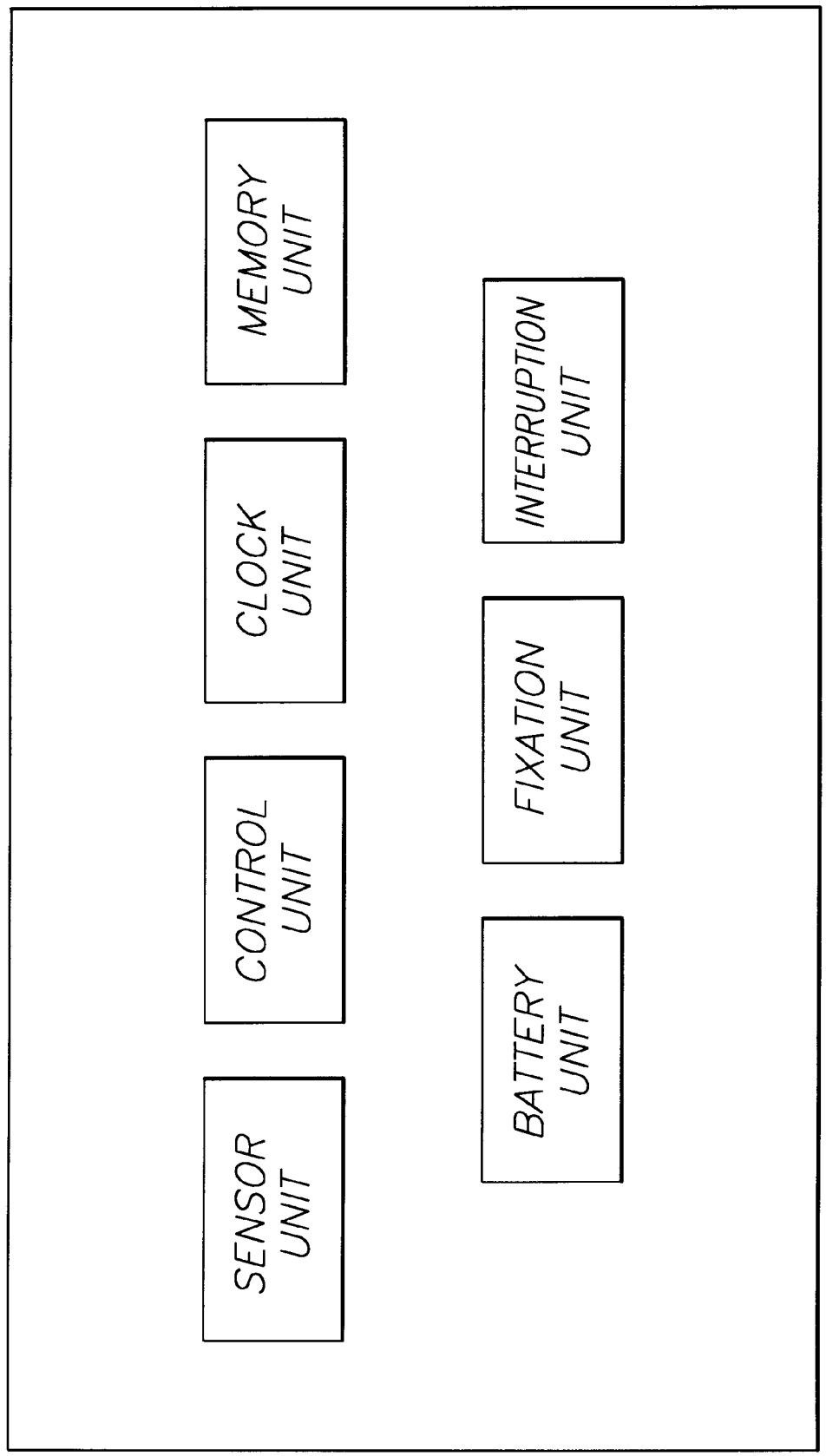

DATA RECORDER

TECHNICAL FIELD

The invention presented refers to a data recorder taking environmental data, in particular temperature data over a pre-defined period of time.

BACKGROUND OF THE INVENTION

A variety of products, especially in medicine and food processing, require strict adherence to certain upper or lower temperature limits during their storage and transport. Otherwise, their characteristic properties are impaired or lost.

Monitoring systems suitable to guarantee such recording have already been developed with widespread use of so-called transition indicators. These transition indicators are in a position to record the adherence to certain value limits, for instance temperature. A further variation of these systems are the so-called data loggers, which are included with the goods to be monitored as electronic cubes or blocks of several $cm^3$ volume.

A major draw-back of the transition indicators mentioned first is that they only discern the adherence to certain value limits and do neither record the duration and time, nor offer the desirable resolution. The data loggers display the disadvantage of being rather expensive compared to the Transition indicators and, in addition, can be removed easily from the goods to be monitored thus opening the door for manipulation.

SUMMARY OF THE INVENTION

A data recorder has been presented consisting of at least one sensor unit to compile at least one measurement value to be recorded during a monitoring interval, a control unit, preferably a microprocessor unit for the control of the compiling and recording of measurement data, a clock unit to provide a reference time on the basis of which conclusions on the actual measurement times are possible, a memory unit to store the measurement values compiled and preferable the reference time provided by the clock unit for each measurement time, a battery unit for power supply, a fixation unit to fix the data recorder to an item to be monitored, an interruption unit to interrupt the compiling and/or recording of measurement values, upon any manipulation of the fixation unit.

BRIEF DESCRIPTION OF THE DRAWINGS

FIG. 1 is a block diagram of a data recorder.

DETAILED DESCRIPTION OF THE INVENTION

The invention presented has the purpose of supplying a data recorder, which can be manufactured at low cost and offers high security against manipulation.

This task is accomplished by the subjects of claims 1, 18, 19 and 20.

Preferred enhancements of the invention are subject of the subclaims.

In the following the invention presented is explained into detail giving preferred variations.

A preferred version of the data recorder invented is in the shape of a card or a type of sticker. In particular, the data recorder can have the shape of a standard chip card and thus be manufactured in the already established production processes for cards of this type.

Independent of the version manufactured, the invented data recorder features one or more sensor structures used for the detection of various environmental data, e.g., temperature, relative humidity, air pressure, noise volume, radioactive radiation or chemical or biological substances.

Furthermore, the data recorder features a memory unit, where the data compiled during the measurement period can be stored. A control unit, preferably in the form of a microprocessor, controls the compiling of the measurement data and the recording.

In addition, a clock unit is provided, on the basis of which the control unit defines the measurement times, and stores the time information together with the measurement values in order to accomplish a time-related recording of the measurement data. The clock unit can either be provided in the form of a watch or simply as a clock signal generator. Via the information of the start and end time of the measurement, and, in particular, when the measurements are a sequence in constant intervals, it is possible to convert these relative time data again into absolute time data later. Thus, the individual measurement values can be assigned to the actual measurement times.

The electronics of the data recorder invented consisting at least of a memory unit, a control unit and a clock unit are preferably integrated onto a single chip. According to a particular aspect of the invention presented, this integration is on an extremely thin chip, preferably of a thickness below 50 $\mu$m, and even more desirable of a thickness between 10 and 20 $\mu$m. Conventional chips feature a thickness between 200–600 $\mu$m, as here as a rule most importance is placed on low area instead of low thickness. According to the invention presented, extremely thin chip layers are preferred, since the chip thus gained features a certain flexibility. This flexibility results in its suitability for the application of the data recorder invented in a sticker. The chip carrying the electronics is thin that the user of the sticker can hardly discern it and can be positioned almost arbitrarily.

For the voltage supply of the electronics of the data recorder, a battery unit is provided. This unit again is preferably designed as an extremely thin cell, and again preferably features a certain flexibility, in particular for the application of the data recorder as a sticker.

Finally, the data recorder features a fixation unit, which is used to fix it to the goods to be monitored and an interruption unit by means of which the recording and/or compiling of measurement data is interrupted as soon as there are any manipulations attempted on the data recorder.

In the design as a sticker, the fixation unit is the adhesive layer itself. Is the card-shaped design selected, the fixation unit is preferable an adhesive layer or a band, which only permits a separation of the goods to be monitored and the data recorder by means of destruction. The interruption unit is preferably designed in a way that any attempted manipulation results in the destruction of an interconnection, thus interrupting the compiling or recording of measurement data. In particular, this may be designed in a way that an electrical connection is provided, which is subject to an irreversible interruption upon the removal of the data recorder from its carrier, i.e., the removal of a mechanical bond between the goods to be monitored on at least one point.

The resulting interruption of the interconnection can be detected during the evaluation of the data recorder later or it immediately results in a disruption of the proper functioning of the data recorder, which again can be discerned via the relevant memory note.

The data recorder proposed can be manufactured at extremely low cost. This holds even more true, when it is designed as an object similar to a card or a sticker. In particular, the invention presented proposes a data recorder for throw-away use, the electronic, mechanical and chemical stand-life are designed for a limited time of application. These period of application can be a storage, transport or production period.

A special application for the data recorder invented is the monitoring of the temperature curve during the time between the manufacture and supply of meat, fish or fruit products to the retailer. For meat products today it is increasingly common to separate units ready for retail sale already by the manufacturer. These units show a comparatively low temperature tolerance, however are transported over long distances, stored over long periods and are resold several times. This results in the problem that the proper storage is no longer under the influence and care of the original supplier. In the case of perished goods, it is frequently impossible to define whether this originates from faulty goods or improper transport and storage. The time-related temperature recording directly on the product, which the data recorder invented renders possible, offers a direct trace to improper handling of the goods. An especially accurate monitoring for meat and fish is feasible, if the data recorder invented is integrated into the vacuum package and thus is linked inseparably to the item to be monitored. The customer or retailer can use the data recorder supplied to define the product quality by means of a suitable read-out system.

In particular, the data recorder invented, offers a combination of the time-related environmental data measured and logistic data. In this context The term logistic data refers to information such as manufacturer, place of manufacture, date, price, etc.

In a design, where the data recorder again has the shape similar to a card or sticker, it can replace the labels, where they are commonly used. Thus it provides the relevant data of labels plus data documenting the proper transport and/or storage of the goods.

An advantage of the data recorder, especially when designed as an object similar to cards or stickers, is a wide and highly flexible range of applications. It can be added to arbitrary goods for transportation even living animals to be transported. The data recorder can be added at a stage, where the item concerned has already gone through critical process steps, which might have a negative effect on the functionality of its electronics. Preferably, the data recorder invented, in a design similar to a card or a sticker, features a unit to activate the measurement process. Preferably this is not done via switches, keys, etc., but by means of a mechanical destruction of an interconnection. A conceivable example would be a solution, where an edge of the relevant card is broken off, or where an area of the relevant sticker is torn off or in. In general, this means that a part of the data recorder body is destroyed to achieve an activation of the recording at a defined point of time.

A type of 'programming' of the data recorder with respect to time intervals and types of measurement, etc., could be done in a similar way. For this purpose several tear-off stripes could be provided and the user tears off a certain number of stripes to 'program' the length of measurement time intervals or to select the type of data to be recorded.

Upon the termination of the recording, for instance, when the item to be monitored has covered the distance from manufacturer to retailer, the data recorded are read out. The read-out procedure can be with our without contact, for example inductively. For the read-out, preferably adapted terminals with a special software which evaluates the read-out data and provides convenient output are used. In particular in the case of a contact-less read-out, the evaluation can be done completely automatically, for instance, by routing the relevant goods over a conveyor belt past the terminals. Goods that the evaluation classifies as reject due to improper condition can be separated.

In order to avoid unnecessary energy consumption during long monitoring periods, it is intended that the control unit or the microprocessor returns to an idle-mode during two measurement intervals. Thus hardly any energy is consumed during the measurement intervals. Preferably, a serial number is written into the memory of the data recorder, in particular for the design as chip card or sticker. This serial number permits a clear identification of the sticker and restricts manipulation. For this purpose the data recorder preferably features a ROM or an EPROM. As already mentioned above, besides the serial number, logistic data such as price, manufacturer, date of manufacture, best-before date, item number, final customer, etc., can be stored.

Furthermore, the data recorder invented, in particular in the design of a chip card, features an extremely flat display that permits the read-out of certain data even without read-out terminal.

Due to the design of the data recorder as a throw-away item, the relevant electronics permit extremely simple design. For instance, no units for data reset are necessary, the data recorder need not be returned, etc.

In a simple design, a reference time is stored in the memory together with each measurement value. Thus relevant data doubles are stored, which can be evaluated by most simple means. If a measurement is done at fixed predefined points of time, which may be derived from an internal clock of the data recorder, a recording of the time is not necessary, since the sequence of the measurement values stored already provides sufficient information on the time sequence. In a design, where only changes are recorded, however, the storage of the points of time is essential, since it is the only way of rendering a definite temporal assignment of the events possible.

In a further design, the data recorder to be invented is already integrated permanently into a transport container, e.g., a chest, preferably welded in. In such a design it may be advantageous to follow a solution, where not all components of the data recorder are permanently fixed to the container, but only those that are suitable for repeated use. Preferably, the control unit or microprocessor, the sensor unit and the clock unit are already present in the transport container, preferable they are not accessible. The memory unit, the battery unit and the interruption unit are inserted newly for each monitoring procedure and have an electrical link to the fixed components with our without direct contact. This solution offers a repeated use of expensive components such as microprocessors, sensors and clock units. The cheap use-up components battery, interruption unit and memory unit are designed as throw away components. Preferably, the fixed parts are activated, when the other parts necessary for functioning (battery, memory, interruption unit) are linked (with or without contact). Preferably, the microprocessor transmits a code to the memory at the start of the measurement, thus activating the actual measurement procedure. As soon as the removable parts are removed, the measurement is interrupted and thus becomes invalid. The code transmitted permits conclusions on which memory unit has been connected to which transport container, and thus handicaps manipulation attempts.

As a further security function, the data are only passed on in encoded form, this is particularly the case in designs, where the data recorder consists of a fixed and a removable part.

Applications for the data recorder invented are for organic materials, in particular food, botanical products, medical data (serums, organ donations, pharmaceuticals). For technical products, an interesting field of application would be a humidity monitoring, for paper and textiles and a temperature monitoring for chemicals. Furthermore, the data recorder invented is suitable for monitoring indoor climate, documenting indoor heating and climate monitoring on pieces of art. Furthermore, there are interesting applications in process technology, the monitoring and documentation of procedures such as the polymerization of plastics, the removal of ice from aeroplanes, the temperature profile during varnish processes, welding processes, etc.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A data recorder comprising:
   at least one sensor unit to compile at least one measurement value to be recorded during a monitoring interval;
   a control unit to control the compiling and recording of measurement data;
   a clock unit to provide a reference time on the basis of which the actual measurement times can be defined;
   a memory unit to store the measurement values compiled and the corresponding reference time provided for each measurement value;
   a battery unit for power supply;
   a fixation unit to fix the data recorder to an item to be monitored; and
   an interruption unit which interrupts the recording and/or compiling of measurement data upon any manipulation of the fixation unit.

2. Data recorder as described in claim 1 characterized by the fact that the data recorder in addition contains an activation unit by means of which the compiling and recording of measurement data can be started at a defined point of time.

3. Data recorder as described in claim 2 characterized by the fact that the activation unit comprises a part of the recorder which has to be removed to achieve an activation.

4. Data recorder as described in claim 1 characterized by the fact that the data recorder is designed as a chip card preferably made of plastic or paper.

5. Data recorder as described in claim 4 characterized by the fact that the fixation unit consists of an adhesive layer by means of which the data recorder can be connected to the item to be monitored.

6. Data recorder as described in claim 4 characterized by the fact that the interruption unit features an interconnection which is destroyed upon manipulation, thus interrupting any further compiling or recording of measurement data.

7. Data recorder as described in claim 4 characterized by the fact that the fixation unit consists of a band which cannot be removed without destruction and links the data recorder to the item to be monitored.

8. Data recorder as described in claim 1 characterized by the fact that the data recorder is designed as a sticker, which is stuck onto the item to be monitored.

9. Data recorder as described in claim 1 characterized by the fact that at least one sensor unit compiles at least one of the following values:
   temperature, relative humidity of surrounding air, acceleration, noise level, radioactive radiation, in particular gamma radiation used for various sterilization processes.

10. Data recorder as described in claim 1 characterized by the fact that the sensor unit contains a chemical sensor with a suitable sensitive coating by means of which the content of certain chemical substances in the surrounding atmosphere can be compiled.

11. Data recorder as described in claim 1 characterized by the fact that in the memory unit for each measurement value, the reference time provided for each measurement value by the clock unit at the time of measurement is stored.

12. Data recorder as described in claim 1 characterized by the fact that an output unit is provided by means of which data concerning the measurement procedure can be read.

13. Data recorder as described in claim 1 characterized by the fact that a identification number is stored in the memory unit by means of which a clear identification of the data recorder is possible.

14. Data recorder as described in claim 1 characterized by the fact that the data recorder is designed as a throw-away article.

15. Data recorder as described in claim 1 characterized by the fact that the data recorder features an interface by means of which the data can be read out by an authorized function via a contact.

16. Data recorder as described in claim 1 characterized by the fact that the data recorder features units by means of which the data can be read out by an authorized function without contact.

17. Data recorder as described in claim 1 characterized by the fact that the control unit sets the data recorder in idle mode between the individual measurement intervals to reduce the battery power required.

18. Transport containers into which a data recorder as described in claim 1 has been permanently integrated.

19. Data recorder as described in claim 1 characterized by the fact that the control unit, the sensor unit and the clock unit define a first part which is intended for repeated use and is designed for integration into a container and that the memory unit, the battery unit and the interruption unit are designed as a second part which is directly fixed to the item to be monitored whereby the first and second parts communicate with each other to function thus together as a data recorder.

20. Data recorders as described in claim 1 characterized by the fact that at least one memory unit, the control unit and the clock unit are integrated onto a chip of less than approximately 20 $\mu$m thickness.

21. A data recorder comprising:
   at least one sensor unit to compile at least one measurement value to be recorded during a monitoring interval;
   a control unit to control the compiling and recording of measurement data;
   a clock unit to provide a reference time on the basis of which the actual measurement times can be defined;
   a memory unit to store the measurement values compiled and the corresponding reference time provided for each measurement value;

a battery unit for power supply;

a fixation unit to fix the data recorder to an item to be monitored;

an interruption unit which interrupts the recording and/or compiling of measurement data upon any manipulation of the fixation unit; and an activation unit by means of which the compiling and recording of measurement data can be started at a defined point of time, wherein the activation unit comprises a part of the recorder which has to be removed to achieve an activation.

* * * * *

UNITED STATES PATENT AND TRADEMARK OFFICE
CERTIFICATE OF CORRECTION

PATENT NO. : 6,185,513 B1  Page 1 of 1
DATED : February 6, 2001
INVENTOR(S) : Andreas Plettner and Karl Haberger It is certified that error appears in the above-identified patent and that said Letters Patent is hereby corrected as shown below:

<u>Column 6,</u>
Line 24, after "that" replace "a" with -- an --.
Line 53, replace "recorders" with -- recorder --.

Signed and Sealed this

Second Day of July, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,185,513 B1  Page 1 of 1
APPLICATION NO. : 09/055022
DATED : February 6, 2001
INVENTOR(S) : Andreas Plettner et al.

It is certified that error appears in the above-identified patent and that said Letters Patent is hereby corrected as shown below:

On the Title Page

(30) Foreign Application
    Priority Data          Insert -- April 3, 1997 (DE) ..... 197 13 799.7 --

Signed and Sealed this

Third Day of June, 2008

JON W. DUDAS
*Director of the United States Patent and Trademark Office*